(12) United States Patent
Sasaki (10) Patent No.: US 7,375,712 B2
(45) Date of Patent: May 20, 2008

(54) LIQUID CRYSTAL DISPLAY WITH SEPARATE POSITIVE AND NEGATIVE DRIVING CIRCUITS

(75) Inventor: Nobuo Sasaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 426 days.

(21) Appl. No.: 10/316,434

(22) Filed: Dec. 11, 2002

(65) Prior Publication Data

US 2003/0146890 A1 Aug. 7, 2003

(30) Foreign Application Priority Data

Feb. 5, 2002 (JP) ............................. 2002-027590

(51) Int. Cl.
*G09G 3/36* (2006.01)
(52) U.S. Cl. ........................................ 345/96
(58) Field of Classification Search .................. 345/96, 345/209, 87, 204
See application file for complete search history.

(56) References Cited

U.S. PATENT DOCUMENTS

| | | | |
|---|---|---|---|
| 4,890,097 A | 12/1989 | Yamashita et al. | |
| 5,132,677 A | 7/1992 | Nicholas | |
| 5,432,527 A | 7/1995 | Yanai et al. | |
| 5,436,635 A | 7/1995 | Takahara et al. | |
| 5,515,072 A | 5/1996 | Yanai et al. | |
| 5,627,557 A * | 5/1997 | Yamaguchi et al. | ........... 345/90 |
| 6,566,643 B2 | 5/2003 | Morita | |
| 2001/0050664 A1 | 12/2001 | Yamazaki et al. | ............. 345/76 |
| 2002/0126108 A1 * | 9/2002 | Koyama et al. | ............. 345/204 |

FOREIGN PATENT DOCUMENTS

| | | |
|---|---|---|
| EP | 0 915 453 | 5/1999 |
| JP | 53-144297 | 12/1978 |
| JP | 63-095420 | 4/1988 |
| JP | 63-096636 | 4/1988 |
| JP | 63-175889 | 7/1988 |
| JP | 2-214819 | 8/1990 |
| JP | 4-014091 | 1/1992 |
| JP | 4-014092 | 1/1992 |
| JP | 4-102825 | 4/1992 |

(Continued)

*Primary Examiner*—Sumati Lefkowitz
*Assistant Examiner*—Rodney Amadiz
(74) *Attorney, Agent, or Firm*—Greer, Burns & Crain, Ltd (57) ABSTRACT

The invention provides an active matrix type TFT LCD in which a driving voltage of pixel TFTs is reduced. A pixel is formed with two thin film transistors, i.e., a positive-voltage-applying n-channel TFT for applying a data voltage having a positive polarity to a pixel electrode and a negative-voltage-applying p-channel TFT for applying a data voltage having a negative polarity to the pixel electrode. A source electrode of the positive-voltage-applying TFT is connected to the pixel electrode; a drain electrode of the same is connected to a data bus line for applying the positive voltage; and a gate electrode of the same is connected to a gate bus line for applying the positive voltage. A source electrode of the other TFT is also connected to the pixel electrode; a drain electrode of the same is connected to a data bus line for applying the negative voltage; and a gate electrode of the same is connected to a gate bus line for applying the negative voltage.

6 Claims, 8 Drawing Sheets

FOREIGN PATENT DOCUMENTS

| | | |
|---|---|---|
| JP | 05-249499 | 9/1993 |
| JP | 5-273522 | 10/1993 |
| JP | 06-266315 | 9/1994 |
| JP | 07-199866 | 8/1995 |
| JP | 2516351 | 4/1996 |
| JP | 11-101967 | 4/1999 |
| JP | 0915453 A1 * | 12/1999 |
| JP | 2000-020033 | 1/2000 |
| JP | 2002-23709 | 1/2002 |

* cited by examiner

LIQUID CRYSTAL DISPLAY WITH SEPARATE POSITIVE AND NEGATIVE DRIVING CIRCUITS

BACKGROUND OF THE INVENTION

1. Field of the Invention

The present invention relates to a liquid crystal display (LCD) and, more particularly, to an active matrix type TFT LCD having a TFT (thin film transistor) as a switching element at each pixel.

2. Description of the Related Art

The market of LCDs is rapidly growing because LCDs have become able to provide display quality that sufficiently allows them to replace CRTs which have been typical displays in the related art. They are used as displays of various viewers, cellular phones, PDAs (personal digital assistants), and notebook type personal computers as well as for monitors of desktop computers and television receivers for home use, thanking to their advantage of being flat panels. Thus, LCDs are used as displays that provide from small screens having diagonal dimensions of about 2 inches to large screens having diagonal dimensions in the excess of 40 inches. More and more LCDs are used in various fields as full-color displays capable of displaying still image and dynamic images.

Referring to the trend in LCD techniques, the main stream has shifted from the passive matrix type that has no switching element in a pixel to the active matrix type that has switching elements such as TFTs. Further, referring to the material of channel regions (active semiconductor layers) of TFTs formed in pixels of active matrix type LCDs, a-Si (amorphous silicon) is being replaced by p-Si (polysilicon) having higher carrier mobility.

Structure of TFT LCDs will now be briefly described. For example, in the case of a transmission type TFT LCD that employs a back-light unit, a TFT substrate (array substrate) that is a transparent insulated substrate such as a glass substrate and an opposite substrate are combined in a face-to-face relationship with a predetermined cell gap therebetween, and a liquid crystal is sealed between the substrates. A plurality of pixel electrodes are provided in the form of a matrix on the TFT substrate, and the TFT is connected to each of the pixel electrodes. A common electrode is formed on the opposite substrate. In the case of a color display LCD, a color filter (CF) is formed on either the TFT substrate or the opposite substrate. Alignment films are formed at interfaces between the substrates and the liquid crystal layer. Polarizers having a crossed Nicols configuration, for example, are applied to the outside of both substrates.

Figure 7:
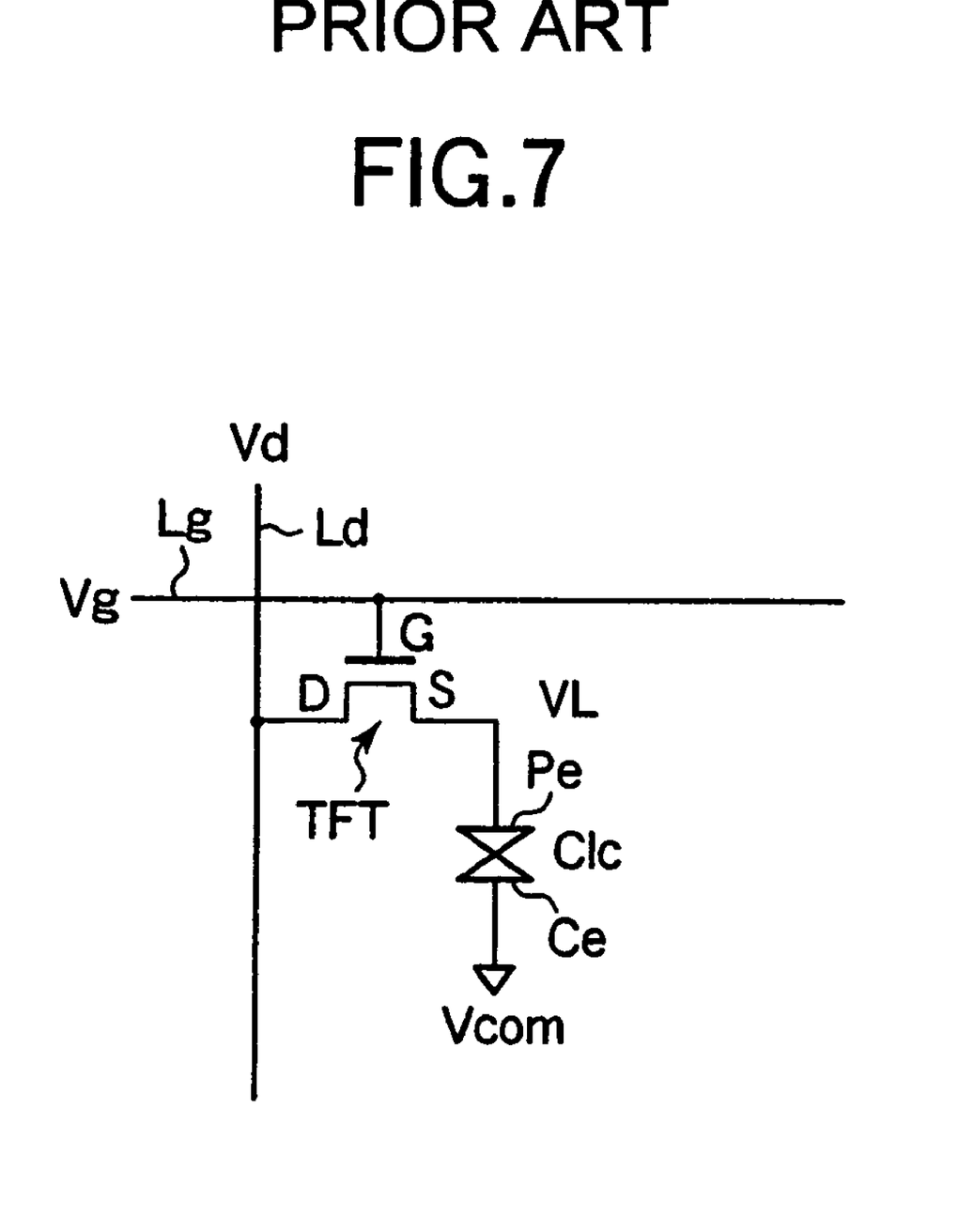
FIG. 7 is an equivalent circuit diagram of one pixel of a TFT LCD in the related art.

FIG. 7 is an equivalent circuit for one pixel of a TFT LCD in the related art. As shown in FIG. 7, a gate electrode G of a TFT is connected to a gate bus line Lg. A source electrode S of the TFT is connected to a pixel electrode Pe, and a drain electrode D is connected to a data bus line Ld. A liquid crystal layer lc is sandwiched by the pixel electrode Pe and a common electrode Ce to form a liquid crystal capacitance Clc. A storage capacitor Cs is connected in parallel with the liquid crystal capacitance in practice, although not shown.

A gate voltage Vg is applied to the gate bus line Lg from a gate bus line driving circuit that is not shown. A grayscale voltage Vd is applied to the data bus line Ld from a data bus line driving circuit that is not shown. A common voltage Vcom (=0 V) is applied to the common electrode Ce.

The liquid crystal lc is positively or negatively anisotropic in its dielectric constant, which results in a property that the liquid crystal molecules rotate in accordance with the strength of an electric field applied thereto. The liquid crystal lc is also anisotropic in its refractive index, which results in a property that the polarization of light passing through the liquid crystal lc changes in accordance with the rotation of the liquid crystal molecules. Therefore, when a voltage is applied between the pixel electrode Pe and the common electrode Ce, the liquid crystal molecules rotate in accordance with the value of the applied voltage, which results in a change in the polarization of the light that has been linearly polarized by the entrance side polarizer in the liquid crystal lc. The quantity of the light that passes through the polarizer at the light emitting side is thereby adjusted to display a tone.

While a voltage of about 5 V can be applied to common liquid crystal materials, when an electric field is continuously applied to the liquid crystal lc only in one direction, the liquid crystal material will be degraded. In order to prevent this, the electric field for driving the liquid crystal is applied to the liquid crystal lc with the polarity thereof inverted in a predetermined cycle. In general, a frame inversion driving is used in which the polarity is inverted in the cycle of display frames.

Figure 8:
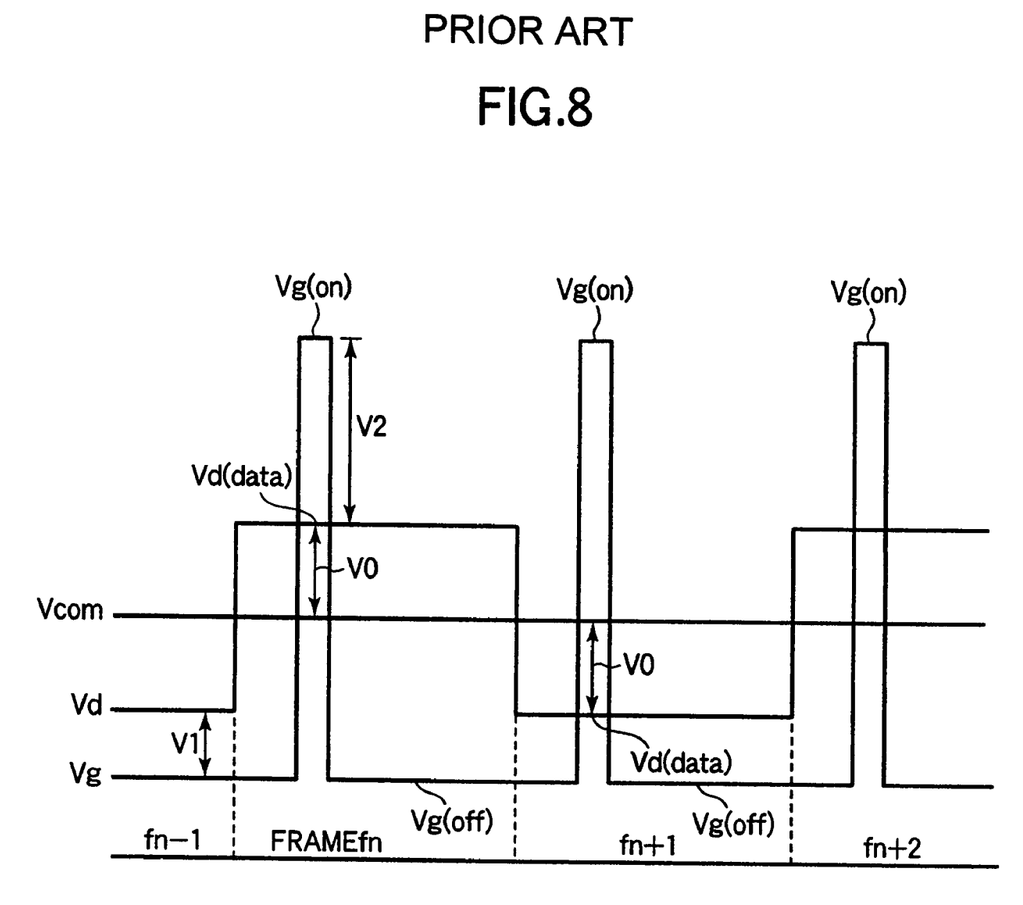
FIG. 8 shows a relationship between a gate voltage Vg, a grayscale voltage Vd, and a common voltage Vcom during frame inversion driving according to the related art.

A separate pixel electrode Pe is provided for each pixel, and a single electrode is provided as the common electrode Ce such that it will be shared by all pixels. A driving method as shown in FIG. 8 is used to achieve the frame inversion driving with utilizing such common electrode Ce. FIG. 8 shows time in the horizontal direction and voltages in the vertical direction to indicate a relationship between the gate voltage Vg, the grayscale voltage Vd, and the common voltage Vcom.

As shown in FIG. 8, the common voltage (the potential at the common electrode) Vcom (=0 V) is constant. The grayscale voltage Vd that ranges up to ±2.5 V of the common voltage Vcom is applied to the data bus line Ld. FIG. 8 shows a state in which the grayscale voltage Vd (data) having an absolute value V0=2.5 V is output on the data bus line Ld in each frame fn, the polarity of the voltage being inverted in each frame fn.

When an n-channel type TFT connected to the gate bus line Lg is to be kept off state, a potential Vg (off) is output which has an absolute value that is smaller than the maximum negative polarity grayscale voltage Vd=−V0 (V) by V1 (absolute value). When the TFT is to be kept on state, a potential Vg (on) is output which has an absolute value that is greater than the maximum positive polarity grayscale voltage Vd=+V0 (V) by V2 (absolute value). That is, a gate pulse having a potential Vg=Vg(on) is output to the gate bus line Lg during a period in which the TFT is made to be on state. The height of the gate pulse is V1+2×V0+V2. The voltage V1 must be increased when the off-current is poorly disconnected, and the voltage V2 must be increased when the on-current is small for reasons associated with the property of retaining accumulated charges and the data rewriting speed. Therefore, a driving voltage of about 13 V is normally used such the TFT will be reliably turned on and off regardless of the polarity of the same.

As thus described, a power supply circuit of 13 V is required to drive the TFT LCD in the related art in spite of the fact that the maximum grayscale voltage Vd required for writing the pixel electrodes Pe is 2.5 V. The driving voltage of 13 V is applied not only to the gate bus line driving circuit but also to switching elements in the data bus line driving circuit for controlling the flow of signals output to the data bus lines Ld. The maximum driving voltage depends on the liquid crystal material used, and some TFT LCDs require a driving voltage of 16 V or 18 V or more that is higher than the voltage in the present example.

As thus described, in the TFT LCD in the related art, the power supply voltage for the gate bus line driving circuit and the data bus line driving circuit for driving the liquid crystal lc at each pixel is very much higher than the voltage band of 5 V applied to the liquid crystal lc. Therefore, the TFT must have a high gate withstand voltage and drain withstand voltage. This results in a need for countermeasures including an increase in the thickness of gate oxide films of the TFT, an increase in the channel length, and an increase in the LDD (lightly doped drain) length. However, such countermeasures result in an increase in fluctuation of a threshold voltage Vth of the TFT and a reduction in the on-current of the TFT. Consequently, a further increase of the driving voltage will be required to achieve proper operations in the presence of a great fluctuation of the threshold Vth, and still further increase of the driving voltage will be required to achieve a required switching speed while suppressing any reduction in the on-current. This only results in a vicious cycle, and no reduction of the driving voltage can be achieved. An increase of the driving voltage is problematic also in that it leads to an increase of power consumption and an increase of electromagnetic interference with environment.

The recent establishment of low temperature polysilicon manufacturing processes has made it possible to fabricate a FET having a channel region formed from p-Si (polysilicon) on a member having a relatively low melting point such as a glass substrate. It therefore becomes possible to fabricate a TFT substrate integral with peripheral circuits in which various circuits including a gate bus line driving circuit and a data bus line driving circuit are incorporated in peripheral regions of a glass substrate on which pixel TFTs are to be fabricated. FETs of the peripheral circuit sections must be formed with a gate length that is as small as possible to allow an operation at a high speed, and they must inevitably be of a low voltage drive type. Further, balanced circuits that consume low power cannot be obtained unless they are of a low voltage drive type.

When the pixel TFTs are of a high voltage drive type, a mixture of the low voltage drive type FET's and high voltage drive type TFTs must be formed on a single glass substrate, which results in a problem in that the manufacturing process will become complicated and the manufacturing cost will increase. Therefore, to manufacture a TFT substrate integral with peripheral circuits utilizing a low temperature polysilicon manufacturing process, the driving voltage of the pixel TFTs must be reduced to become as close as possible to the driving voltage of the FET's of the peripheral circuits.

SUMMARY OF THE INVENTION

The invention has an object to provide a liquid crystal display in which a driving voltage of pixel TFTs is reduced.

The above described object is achieved by a liquid crystal display comprising a liquid crystal capacitance formed by sandwiching a liquid crystal between electrodes facing each other; a positive polarity driving circuit system for applying a voltage of a positive polarity between the electrodes to charge the liquid crystal capacitance with a positive charge; and a negative polarity driving circuit system provided separately from the positive polarity driving circuit system for applying a voltage of a negative polarity between the electrodes to charge the liquid crystal capacitance with a negative charge.

DETAILED DESCRIPTION OF THE PREFERRED EMBODIMENTS

Liquid crystal displays and methods for driving the same in a mode for carrying out the invention will now be described with reference to FIGS. 1 to 6. A liquid crystal display (TFT LCD) in the present mode for carrying out the invention is characterized in that a liquid crystal capacitance is charged with a positive charge and a negative charge by separate circuit systems (a positive polarity driving circuit system and a negative polarity driving circuit system), respectively. For this purpose, two TFTs are provided at each pixel; one of the TFTs functions as a switching element for writing grayscale data having the positive polarity; and the other TFT functions as a switching element for writing grayscale data having the negative polarity.

While voltages having the positive and negative polarities are applied to a pixel electrode by a single common driving circuit in a TFT LCD in the related art, a positive voltage and a negative voltage are respectively applied by separate driving circuits in the present mode for carrying out the invention. Therefore, the amplitude of each of grayscale data voltages applied to the TFT to which a positive voltage is to be applied and the TFT to which a negative voltage, can be reduced to half of the amplitude according to the related art, which makes it possible to suppress gate pulse voltages applied to gate electrodes of the TFTs.

TFT LCDs and methods of driving the same in the present mode for carrying out the invention will now be specifically described with reference to preferred embodiments of the invention.

First Embodiment

Figure 1:
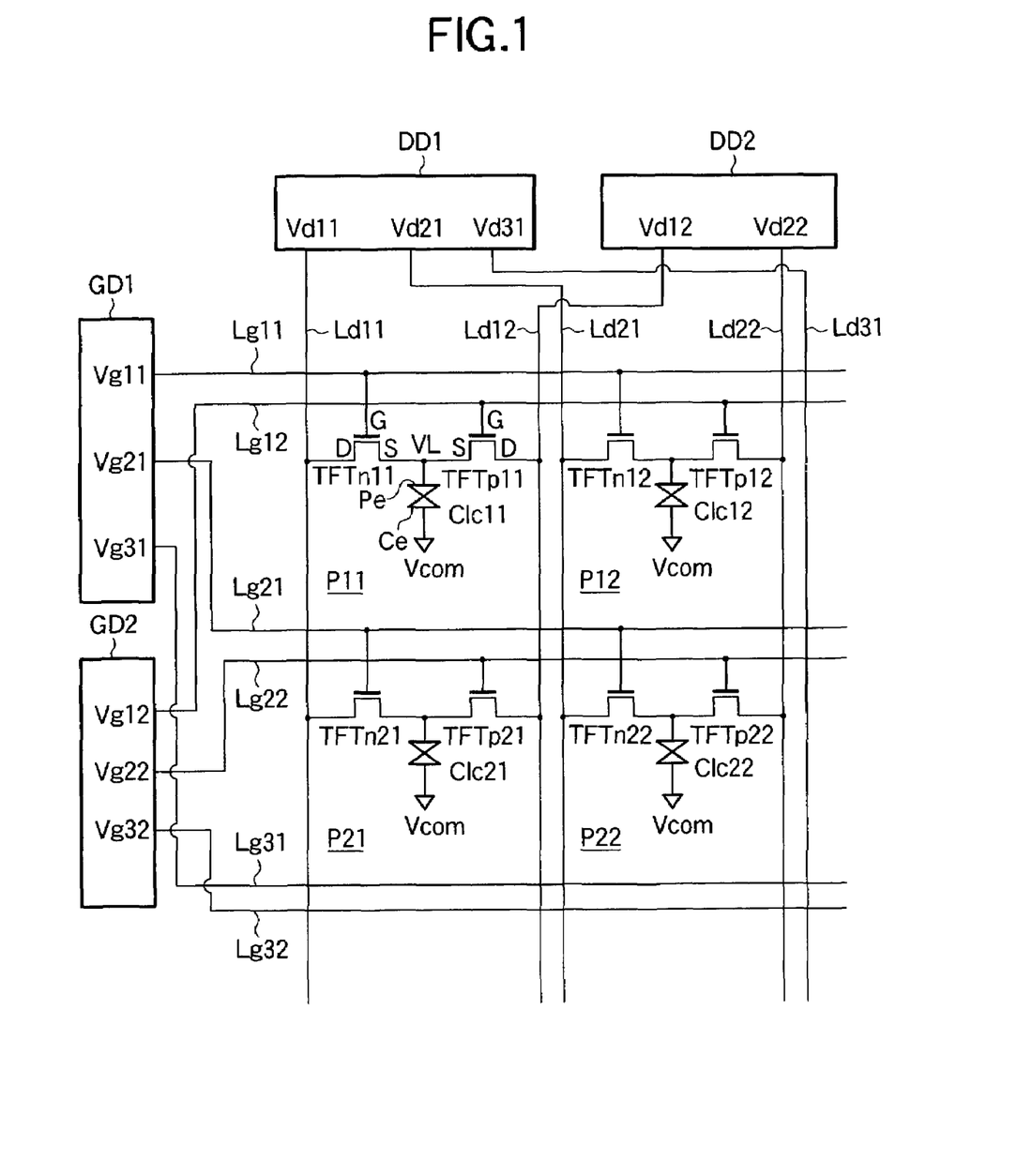
FIG. 1 is an equivalent circuit diagram of four pixels of a TFT LCD according to a first embodiment of the invention.

A TFT LCD of a first embodiment of the invention and a method for driving the same will be described with reference to FIGS. 1 and 2. First, a schematic configuration of the TFT LCD of the present embodiment will be described with reference to FIG. 1. FIG. 1 shows an equivalent circuit of four pixels P11, P12, P21, and P22 adjacent to each other among a plurality of pixels Pmn provided in the form of a matrix on an insulated substrate. At the pixels Pmn, liquid crystal capacitances Clcmn are formed by sandwiching a liquid crystal lc between pixel electrodes Pe on a TFT substrate and a common electrode Ce on an opposite substrate. A common voltage (common electrode potential) Vcom (=0 V) is applied to the common electrode Ce.

In peripheral regions of the substrate adjacent to the region where the pixels are formed, peripheral circuits are formed integrally with the region where the pixels are formed using a low temperature polysilicon manufacturing process, for example. Referring to some of the peripheral circuits, there are formed a gate bus line driving circuit GD1 for positive polarity driving, a gate bus line driving circuit GD2 for negative polarity driving, a data bus line driving circuit DD1 for positive polarity driving, and a data bus line driving circuit DD2 for negative polarity driving.

Gate bus lines Lg 11, Lg21, Lg31, . . . for applying a positive voltage extending in the horizontal direction of the figure are connected to the gate bus line driving circuit GD1 for positive polarity driving. Gate bus lines Lg12, Lg22, Lg32, . . . for applying a negative voltage that adjoin the gate bus lines Lg11, Lg21, Lg31, . . . for applying a positive voltage, respectively, and extend in parallel with them are connected to the gate bus line driving circuit GD2 for negative polarity driving.

Data bus lines Ld11, Ld21, Ld31, . . . for applying a positive voltage extending in the vertical direction of the figure are connected to the data bus line driving circuit DD1 for positive polarity driving. Data bus lines Ld 12, Ld22, . . . for applying. a negative voltage that adjoin the data bus lines Ld11, Ld21, Ld31, . . . for applying a positive voltage, respectively, and extend in parallel with them are connected to the data bus line driving circuit DD2 for negative polarity driving.

A positive polarity driving circuit system is formed by the gate bus line driving circuit GD1 for positive polarity driving, the gate bus lines Lg11, Lg21, Lg31, . . . for applying a positive voltage, the data bus line driving circuit DD1 for positive polarity driving, and the data bus lines Ld11, Ld21, Ld31, . . . for applying a positive voltage. The positive polarity driving circuit system is used for charging the liquid crystal capacitances Clcmn with a positive charge by applying a positive voltage between the electrodes Pe of the pixels Pmn and the electrode Ce.

A negative polarity driving circuit system is formed by the gate bus line driving circuit GD2 for negative polarity driving, the gate bus lines Lg12, Lg22, Lg32, . . . for applying a negative voltage, the data bus line driving circuit DD2 for negative polarity driving, and the data bus lines Ld12, Ld22, . . . for applying a negative voltage. The negative polarity driving circuit system is used for charging the liquid crystal capacitances Clcmn with a negative charge by applying a negative voltage between the electrodes Pe of the pixels Pmn and the electrode Ce.

Referring to the pixel P11 by way of example, the pixel P11 is formed with two thin film transistors, i.e., an n-channel TFT n11 as a positive-voltage-applying TFT for applying a data voltage having the positive polarity to the pixel electrode Pe and a p-channel TFT p11 as a negative-voltage-applying TFT for applying a data voltage having the negative polarity to the pixel electrode Pe.

A source electrode S of the TFT n11 is connected to the pixel electrode Pe; a drain electrode D of the same is connected to the data bus line Ld11 for applying the positive voltage; and a gate electrode G of the same is connected to the gate bus line Lg11 for applying the positive voltage.

A source electrode S of the TFT p11 is also connected to the pixel electrode Pe; a drain electrode D of the same is connected to the data bus line Ld12 for applying the negative voltage; and a gate electrode G of the same is connected to the gate bus line Lg11 for applying the negative voltage. The rest of the pixels Pmn have the same configuration. Storage capacitors Csmn are connected in parallel with the liquid crystal capacitances Clcmn in practice, although not shown.

In the above configuration, when a gate pulse Vg11 (on) for applying the positive voltage is output to the gate bus line Lg11 for applying the positive voltage from the gate bus line driving circuit GD1 for positive polarity driving in a display frame f(2n) (n is a positive integer), TFT n11 and TFT n12, . . . whose gate electrodes G are connected to the gate bus line Lg11 for applying the positive voltage are turned on. As a result, grayscale voltages Vd11, Vd2, Vd31, . . . output to the data bus lines Ld11, Ld21, Ld31, . . ., respectively, from the data bus line driving circuit DD1 for positive polarity driving are written in the pixel electrodes Pe of respective pixels P1n through TFT n1n. When the above operation is performed on all of the gate bus lines Lgm1 for positive polarity driving on the basis of line sequential driving, the writing of grayscale voltages for one frame period is completed.

When a gate pulse Vg12 (on) for applying the negative voltage is then output to the gate bus line Lg12 for applying the negative voltage from the gate bus line driving circuit GD2 for negative polarity driving in the next display frame f (2n+l), TFTs p11, p12, . . . whose gate electrodes G are connected to the gate bus line Lg12 for applying the negative voltage are turned on. As a result, grayscale voltages Vd12, Vd22, . . . output to the data bus lines Ld12, Ld22, . . . respectively, from the data bus line driving circuit DD2 for negative polarity driving are written in the pixel electrodes Pe of respective pixels P1n through TFTs p1n. When the above operation is performed on all of gate bus lines Lgm2 for negative polarity driving on the basis of line sequential driving, the writing of grayscale voltages for one frame period is completed.

The display frames f(2n) and f(2n+l) are sequentially and repeatedly driven to perform frame inversion driving.

A detailed description will now be made based on FIG. 2 and with reference to FIG. 1 on optimum levels (voltages) of gate pulses Vgm1 (on) for applying the positive voltage and gate pulses Vgm2 (on) for applying the negative voltage. In FIG. 2, a time base t is plotted in the horizontal direction and voltage levels are plotted in the vertical direction to indicate a relationship between a gate voltage Vg, a grayscale voltage Vd, and a common voltage Vcom. In FIG. 2, voltage levels of the positive polarity driving circuit system relative to the time base t are shown above the time base t, and voltage levels of the negative polarity driving circuit system relative to the time base t are shown under the time base t. For simplicity of description, FIG. 2 shows the gate pulse Vg11 (on) for applying the positive voltage and the gate pulse Vg12 (on) for applying the negative voltage that are respectively applied to the gate electrodes G of the TFTs n11 and p11 of the pixel P11.

The common voltage (common electrode potential) Vcom (=0 V) is constant. In the present embodiment, a maximum positive grayscale voltage Vd11max is +2.5 V, and a maximum negative grayscale voltage Vd12max is −2.5 V. A threshold voltage Vthn of the TFT n11 is Vth0 (a typical threshold voltage) ±Δ, and a threshold voltage Vthp of the TFT p11 is $-Vth0 \pm \Delta$. Let us assume that the typical threshold voltage Vth0 is 3 V and that the fluctuation $\Delta$ is 1 V. It is also assumed that VL represents a potential at the pixel electrodes Pe of the TFTs n11 and p11 (see FIG. 1).

Figure 2:
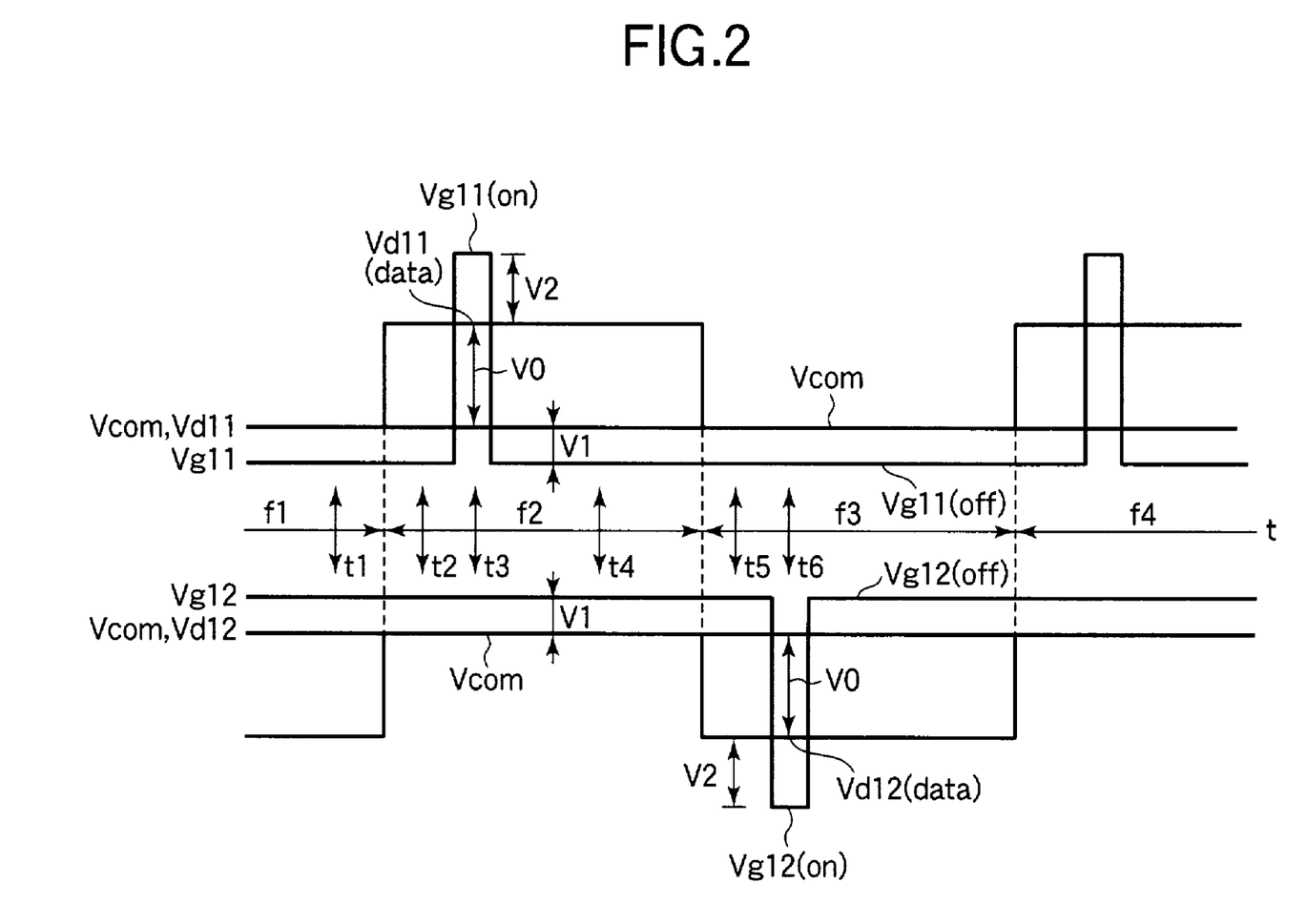
FIG. 2 shows a relationship between a gate voltage Vg, a grayscale voltage Vd, and a common voltage Vcom during frame inversion driving according to the first embodiment in the mode for carrying out the invention.

First, the frame inversion driving shown in FIG. 2 will be schematically described. As shown in FIG. 2, a positive grayscale voltage Vd11 (data) is applied to the pixel electrode Pe of the pixel P11 in even-numbered frames f2 and f4, and a negative grayscale voltage Vd12 (data) is applied to the same in odd-numbered frames f1 and f3.

The magnitude of the gate pulse Vg11 (on) for applying the positive voltage and the gate pulse Vg12 (on) for applying the negative voltage is obtained as V0+V1+V2 where the maximum grayscale voltages have an absolute value V0=2.5 V and where the gate pulses have an absolute voltage V1 and an absolute voltage V2 as shown in FIG. 2.

In other words, in order to keep the TFT n11 off, the potential at the gate electrode G of the TFT n11 must be kept lower than a minimum positive grayscale voltage Vd11min=Vcom=0 V by V1 (absolute value). In order to keep the TFT n11 on, the potential at the gate electrode G of the TFT n11 must be kept higher than the maximum positive grayscale voltage Vd11max=V0=2.5 V by V2 (absolute value).

In order to keep the TFT p11 off, the potential at the gate electrode G of the TFT p11 must be kept higher than a minimum negative grayscale voltage Vd12min=Vcom=0 V by V1 (absolute value). In order to keep the TFT p11 on, the potential at the gate electrode G of the TFT p11 must be kept lower than the maximum negative grayscale voltage Vd12max=−V0=−2.5 V by V2 (absolute value).

A description will be first made on the gate pulse Vg11 (on) for applying the positive voltage that is applied to the gate electrode G of the TFT n11 which is an n-channel FET by the positive polarity driving circuit system shown above the time base t in FIG. 2.

In order for the TFT n11 to be kept off, a potential difference between either voltage Vd11 output to the data bus line Ld11 for applying the positive voltage or voltage VL at the pixel electrode Pe, whichever lower, and the voltage Vg11 output to the gate bus line Lg11 for applying the positive voltage must be smaller than the threshold voltage Vthn of the TFT n11 that is equal to $Vth0 \pm \Delta$. At a point in time t1 in FIG. 2 when the voltage VL at the pixel electrode Pe is −2.5 V, the TFT n11 must be off.

Specifically, $$Vg11-Min(Vd11, VL)<Vth0-\Delta \qquad \text{Equation 1}$$

Since Vg11=−V1; Min(Vd11, VL)=−2.5; and Vth0−Δ=2, Equation 1 can be rearranged as follows by substituting those values in the same.

V1>0.5

At a point in time t2 when the voltage VL at the pixel electrode Pe is −2.5 V, the TFT n11 must be off. Therefore, Equation 1 is used just as done at the point in time t1.

$$Vg11-Min(Vd11, VL)<Vth0-\Delta \qquad \text{Equation 1}$$

Since Vg11=−V1; Min(Vd11, VL)=−2.5; and Vth0−Δ=2, Equation 1 can be rearranged as follows by substituting those values in the same.

V1>0.5

At a point in time t3, the grayscale voltage Vd11=Vd11 (data)=2.5 V. While the voltage VL at the pixel electrode Pe is −2.5 V at the instance when the TFT n11 is turned on, the voltage VL at the pixel electrode Pe=Vd11 (data)=2.5 V immediately after the grayscale voltage Vd11 (data) is written in the pixel electrode Pe. The TFT n11 must be kept on until the writing is completed.

Specifically, $$Vg11-Min(Vd11, VL)>Vth0+\Delta \qquad \text{Equation 2}$$

Since Vg11=V0+V2=2.5+V2; Min(Vd11, VL)=2.5; and Vth0+Δ=4, Equation 2 can be rearranged as follows by substituting those values in the same.

V2>4

At a point in time t4 when the voltage VL at the pixel electrode Pe is 2.5 V, the TFT n11 must be off. Therefore, Equation 1 is used just as done at the point in time t1.

$$Vg11-Min(Vd11, VL)<Vth0-\Delta \qquad \text{Equation 1}$$

Since Vg11=−V1; Min (Vd11, VL)=2.5; and Vth0−Δ=2, Equation 1 can be rearranged as follows by substituting those values in the same.

V1>−4.5

At a point in time t5 when the voltage VL at the pixel electrode Pe is 2.5 V and the voltage Vg11 is 0 V, the TFT n11 must be off.

Since Vg11=−V1; Min(Vd11, VL)=0; and Vth0−Δ=2, Vg11−Min(Vd11, VL)=−V1<0

The state at a point in time t6 is the same as that at the point in time t1.

Therefore, what is required for the gate pulse Vgm1 (on) for applying the positive voltage to be applied to the n-channel TFT n11 is to satisfy relationships expressed by V1>0.5 and V2>4. What is required for the gate pulse Vgm2 (on) for applying the negative voltage to be applied to the p-channel TFT p11 is to satisfy relationships expressed by V1>0.5 and V2>4 because the above discussion is absolutely true except that the polarity is inverted.

Thus, the gate pulse Vg11 (on) for applying the positive voltage and the gate pulse Vg12 (on) for applying the negative voltage have a minimum voltage amplitude of V0+V1+V2=2.5+0.5+4=7 V where the threshold voltage Vth0=3 V and the fluctuation Δ is 1 V. That is, a power supply voltage of 7 V may be used for both of the positive polarity driving circuit system and the negative polarity driving circuit system.

As thus described, in the present embodiment, the power supply voltage for the gate bus line driving circuit and the data bus line driving circuit for driving the liquid crystal lc at each pixel can be significantly smaller than that in the related art. It is therefore possible to use TFTs having a relatively low gate withstand voltage and drain withstand voltage as elements for switching pixels. This consequently makes it possible to reduce the thickness of gate oxide films of pixel TFTs, to reduce the channel length thereof, and to reduce the LDD length thereof. Thus, fluctuation of a threshold voltage Vth of TFTs can be reduced, and any reduction in the on-current of TFTs can be suppressed. Further, the reduction of a driving voltage makes it possible to reduce power consumption and to reduce electromagnetic interference with environment.

When a TFT substrate integral with peripheral circuits is fabricated using a low temperature polysilicon manufacturing process, the peripheral circuit sections can be formed using low voltage drive type FETs, which makes it possible to provide peripheral circuits which are capable of high speed operations, which consume less power, and which are well-balanced.

Further, since pixel TFTs can be of the low voltage drive type, there is no need for forming a mixture of low voltage drive type FETs and high voltage drive type TFTs on a single glass substrate, which makes it possible to simplify manufacturing processes and to reduce manufacturing costs.

Second Embodiment

Figure 3:
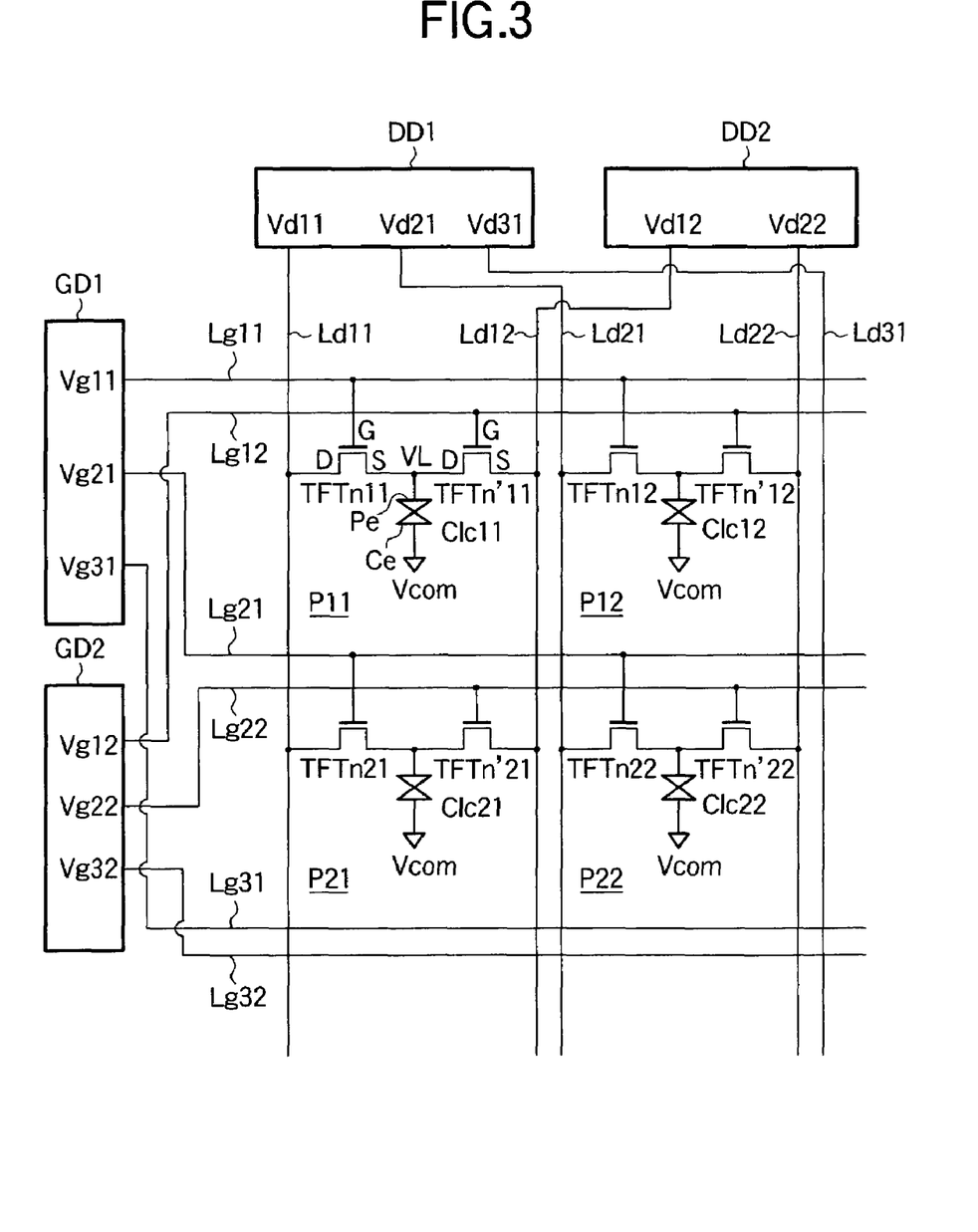
FIG. 3 is an equivalent circuit diagram of four pixels of a TFT LCD according to a second embodiment of the invention in the mode for carrying out the invention.

A TFT LCD of a second embodiment of the invention and a method for driving the same will be described with reference to FIGS. 3 and 4. FIG. 3 is an equivalent circuit similar to FIG. 1 for the first embodiment, and it shows a schematic configuration of the TFT LCD of the present embodiment. The TFT LCD of the present embodiment has the same configuration as that of the first embodiment except that the p-channel TFTs pmn of the TFT LCD of the first embodiment are replaced by n-channel TFTs n'mn. Elements that function and operate in a manner similar to that in the first embodiment are indicated by like reference numerals and will not be described.

Referring to a pixel P11 by way of example, the pixel P11 is formed with two thin film transistors, i.e., an n-channel TFT n11 as a positive-voltage-applying TFT for applying a data voltage having the positive polarity to a pixel electrode Pe and an n-channel TFT n'11 as a negative-voltage-applying TFT for applying a data voltage having the negative polarity to the pixel electrode Pe.

A source electrode S of the TFT n11 is connected to the pixel electrode Pe; a drain electrode D of the same is connected to a data bus line Ld11 for applying a positive voltage; and a gate electrode G of the same is connected to a gate bus line Lg11 for applying the positive voltage.

A drain electrode D of the TFT n'11 is connected to the pixel electrode Pe; a source electrode S of the same is connected to a data bus line Ld12 for applying a negative voltage; and a gate electrode G of the same is connected to a gate bus line Lg11 for applying the negative voltage. The rest of the pixels Pmn have the same configuration.

A detailed description will now be made based on FIG. 4 and with reference to FIG. 3 on optimum levels (voltages) of gate pulses Vgm1 (on) for applying the positive voltage and gate pulses Vgm2 (on) for applying the negative voltage. FIG. 4 indicates a relationship between a gate voltage Vg, a grayscale voltage Vd, and a common voltage Vcom during frame inversion driving of the TFT LCD of the present embodiment under the same conditions as those shown in FIG. 2 for the first embodiment.

Since the description of the TFT n11 in the first embodiment absolutely applies to the magnitude of a gate pulse Vg11 (on) for applying the positive voltage to be applied to the gate electrode G of the TFT n11 by a positive polarity driving circuit system shown above a time base t in FIG. 4, it is only required that relationships expressed by V1=0.5 and V2=4 are satisfied. Therefore, a minimum voltage amplitude of the positive polarity driving circuit system is 0.5+4+2.5=7 V.

A description will now be made on a gate pulse Vg12 (on) for applying the negative voltage to be applied to the gate electrode G of the TFT n'11 that is an n-channel FET by a negative polarity driving circuit system shown under the time base t in FIG. 4.

Figure 4:
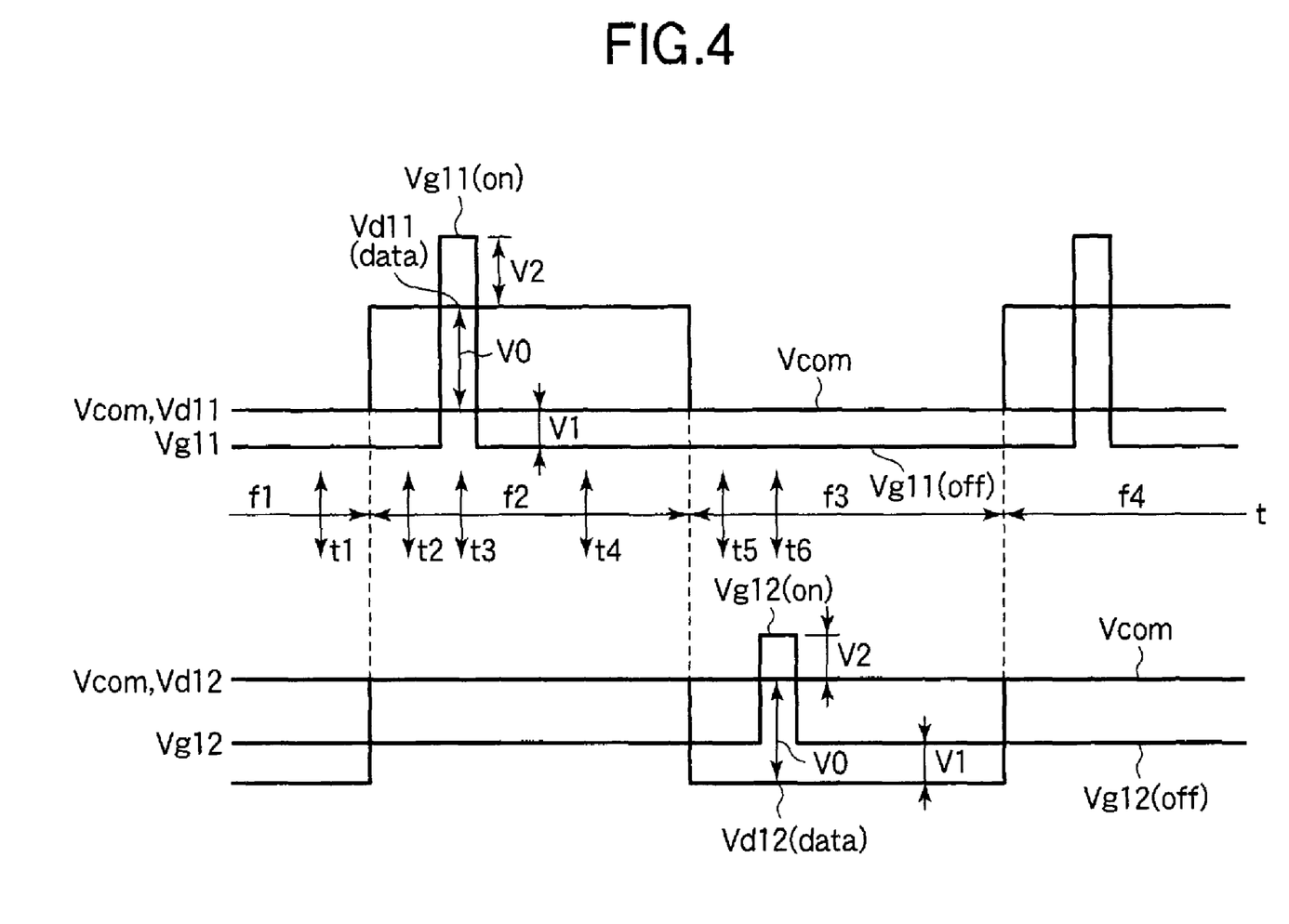
FIG. 4 shows a relationship between a gate voltage Vg, a grayscale voltage Vd, and a common voltage Vcom during frame inversion driving according to the second embodiment in the mode for carrying out the invention.

At a point in time t1 in FIG. 4 when a voltage VL at the pixel electrode Pe is −2.5 V, the TFT n'11 must be off.

Specifically, $$Vg12-Min(Vd12, VL) < Vth0-\Delta \qquad \text{Equation 3}$$

Since Vg12=−2.5+V1; Min(Vd12, VL)=−2.5; and Vth0−Δ=2, Equation 3 can be rearranged as follows by substituting those values in the same.

V1<2

At a point in time t2 when the voltage VL at the pixel electrode Pe is −2.5 V, the TFT n'11 must be off. Equation 3 is used just as done at the point in time t1.

$$Vg12-Min(Vd12, VL) < Vth0-\Delta \qquad \text{Equation 3}$$

Since Vg12=−2.5+V1; Min(Vd12, VL)=−2.5; and Vth0−Δ=2, Equation 3 can be rearranged as follows by substituting those values in the same.

V1<2

At a point in time t3, a positive grayscale voltage Vd11=Vd11 (data)=2.5 V is written in the pixel electrode Pe. At this time, a grayscale voltage Vd12=0 V. While the voltage VL at the pixel electrode Pe is −2.5 V at the instance when the TFT n11 on the positive polarity side is turned on, the voltage VL at the pixel electrode Pe =Vd11 (data) equals 2.5 V immediately after the grayscale voltage Vd11 (data) is written in the pixel electrode Pe. At this time, the TFT n'11 on the negative polarity side must be kept off until the writing is completed.

Specifically, $$Vg12-Min(Vd12, VL) < Vth0+\Delta \qquad \text{Equation 3}$$

Since Vg12=−V0+V1=−2.5+V1; Min(Vd12, VL)=0; and Vth0−Δ=2, Equation 3 can be rearranged as follows by substituting those values in the same.

V1<4.5

At a point in time t4 when the voltage VL at the pixel electrode Pe is 2.5 V, the TFT n'11 must be off. Therefore, Equation 3 is used just as done at the point in time t1.

$$Vg12-Min(Vd12, VL) < Vth0-\Delta \qquad \text{Equation 3}$$

Since Vg12=−2.5+V1; Min (Vd12, VL)=0; and Vth0−Δ=2, Equation 3 can be rearranged as follows by substituting those values in the same.

V1<0.5

At a point in time t5 when the voltage VL at the pixel electrode Pe is 2.5 V and the voltage Vg12 is 0 V, the TFT n'11 must be off.

$$Vg12-Min(Vd12, VL) < Vth0-\Delta \qquad \text{Equation 3}$$

Since Vg12=−2.5+V1; Min(Vd12, VL)=2.5; and Vth0−Δ=2, Equation 3 can be rearranged as follows by substituting those values in the same.

V1<2

At a point in time t6, the grayscale voltage Vd12=Vd12 (data)=−2.5 V. While the voltage VL at the pixel electrode Pe is 2.5 V at the instance when the TFT n'11 is turned on, the voltage VL at the pixel electrode Pe=Vd12 (data)=−2.5 V immediately after the maximum grayscale voltage Vd12 (data) is written in the pixel electrode Pe. The TFT n'11 must be kept on until the writing is completed.

Specifically, $$Vg12-Min(Vd12, VL) > Vth0+\Delta \qquad \text{Equation 4}$$

Since Vg12=V2; Min(Vd12, VL)=−2.5; and Vth0+Δ=4, Equation 4 can be rearranged as follows by substituting those values in the same.

V2>1.5

Therefore, what is required for the gate pulse Vgm2 (on) for applying the negative voltage to be applied to the n-channel TFTn'11 on the negative polarity side is to satisfy relationships expressed by V1<2 and V2>1.5.

Thus, the gate pulse Vg11 (on) for applying the positive voltage has a minimum voltage amplitude of V0+V1+V2=2.5+0.5+4=7 V, and the gate pulse Vg12 (on) for applying the negative voltage has a minimum voltage amplitude of V0+V1(=0)+V2=2.5+1.5=4V where the threshold voltage Vth0=3V and the fluctuation Δ is 1 V. That is, a power supply voltage of 7 V may be used for both of the positive polarity driving circuit system and the negative polarity driving circuit system.

In general, when the off-current of the TFT is poorly discontinued, the voltage V1 of the TFT nmn on the positive polarity side is increased, and the voltage V1 of the TFT n'mn on the negative polarity side is reduced. When the on-current is small, the voltage V2 of both of the positive TFT nmn and negative TFT n'mn must increased for reasons associated with the property of retaining accumulated charges and the data writing speed. On the contrary, in the present embodiment, since a low driving voltage can be used, the gate oxide films of the TFTs can be made thin, which makes it possible to improve the above-mentioned characteristics of interest. It is therefore possible to minimize the voltages V1 and V2, which consequently allows a further reduction of the power supply voltage.

Third Embodiment

Figure 5:
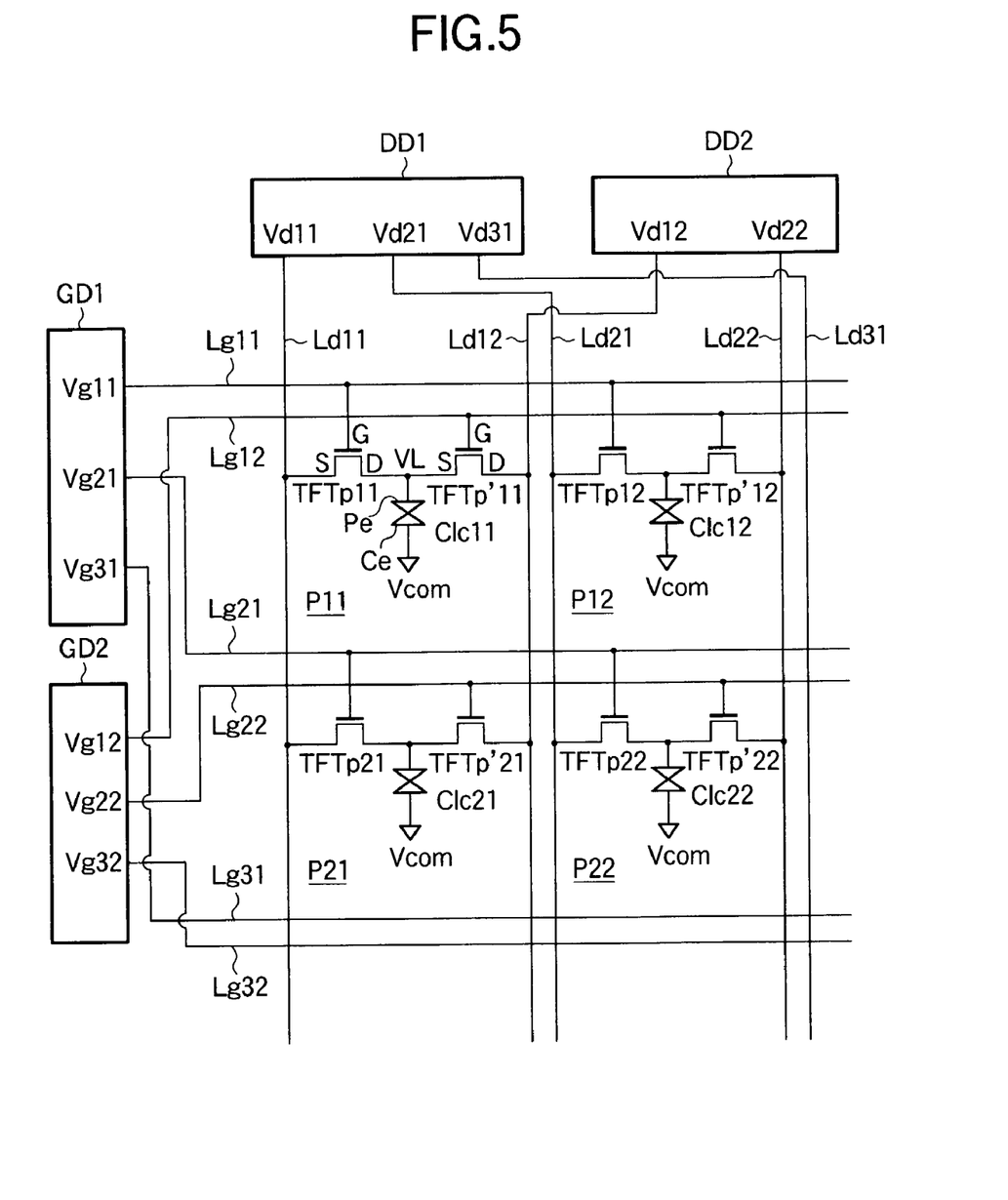
FIG. 5 is an equivalent circuit diagram of four pixels of a TFT LCD according to a third embodiment of the invention in the mode for carrying out the invention.

A TFT LCD of a third embodiment of the invention and a method for driving the same will be described with reference to FIGS. 5 and 6. FIG. 5 is an equivalent circuit similar to FIGS. 1 and 3 for the first and second embodiments, and it shows a schematic configuration of the TFT LCD of the present embodiment. The TFT LCD of the present embodiment has the same configuration as that of the second embodiment except that the n-channel TFT nmn and TFT n'mn for the positive and negative polarities of the TFT LCD of the second embodiment are replaced by p-channel TFT pmn and TFT p'mn, respectively. Elements that function and operate in a manner similar to those in the second embodiment are indicated by like reference numerals and will not be described.

Referring to a pixel P11 by way of example, the pixel P11 is formed with two thin film transistors, i.e., a p-channel TFT p11 as a positive-voltage-applying TFT for applying a data voltage having the positive polarity to a pixel electrode Pe and a p-channel TFT p'11 as a negative-voltage-applying TFT for applying a data voltage having the negative polarity to the pixel electrode Pe.

A drain electrode D of the TFT p11 is connected to the pixel electrode Pe, and a source electrode S of the same is connected to a data bus line Ld11 for applying a positive voltage, and a gate electrode G thereof is connected to a gate bus line Lg11 for applying the positive voltage.

A drain electrode D of the TFT p'11 is connected to a data bus line Ld12 for applying a negative voltage; a source electrode S of the same is connected to the pixel electrode Pe; and a gate electrode G of the same is connected to the gate bus line Lg11 for applying the negative voltage. The rest of the pixels Pmn have the same configuration.

Figure 6:
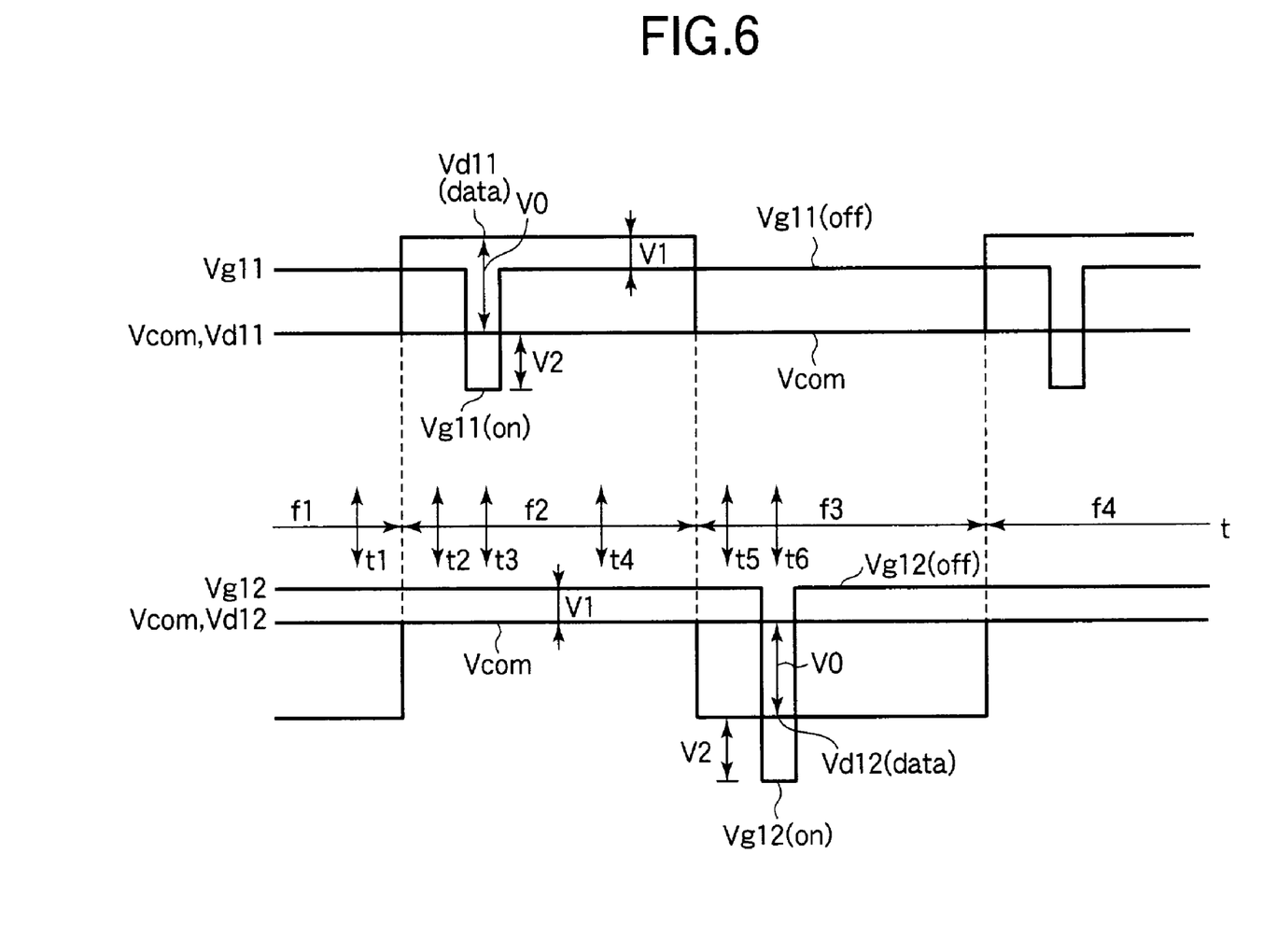
FIG. 6 shows a relationship between a gate voltage Vg, a grayscale voltage Vd, and a common voltage Vcom during frame inversion driving according to the third embodiment in the mode for carrying out the invention.

FIG. 6 illustrates optimum levels (voltages) of gate pulses Vgm1 (on) for applying the positive voltage and gate pulses Vgm2 (on) for applying the negative voltage in the present embodiment. FIG. 6 indicates a relationship between a gate voltage Vg, a grayscale voltage Vd, and a common voltage Vcom during frame inversion driving of the TFT LCD of the present embodiment under the same conditions as those shown in FIG. 4 for the second embodiment.

The description of the TFT n11 in the second embodiment absolutely applies to the magnitude of a gate pulse Vg11 (on) for applying the positive voltage to be applied to the gate electrode G of the TFT p11 by a positive polarity driving circuit system shown above a time base t in FIG. 6 except that the polarity is inverted. The description of the TFT n'11 in the second embodiment absolutely applies to the magnitude of a gate pulse Vg12 (on) for applying the negative voltage to be applied to the gate electrode G of the TFT p'11 by a negative polarity driving circuit system shown under the time base t in FIG. 6 except that the polarity is inverted.

It will be apparent from the above that a power supply voltage of 7 V can be used for both of the positive polarity driving circuit system and the negative polarity driving system where a threshold voltage Vth0=3 V and fluctuation Δ=1V. The same effects as in the Embodiment 2 can be achieved.

As described above, in the present mode for carrying out the invention, since the pulse height of a gate pulse output from a gate bus line driving circuit for driving pixels of an active matrix type LCD can be reduced, a low power supply voltage can be used for the gate bus line driving circuit. Since this makes it possible to use a low power supply voltage for the data bus line driving circuit, a reduction in power consumption can be achieved. Further, the low power supply voltage makes it possible to use a gate oxide film having a smaller thickness, which allows a transistor to operate at a high speed (i.e., to have high transconductance) with less fluctuation of a threshold voltage Vth. The reduction of the fluctuation of the threshold voltage Vth allows a further reduction of the driving voltage. Further, a voltage applied between a drain and a source is also reduced, which makes it possible to form a TFT with a transistor structure that requires a small withstand voltage between the drain and source and that is easily to fabricate.

Since a pixel structure in the present mode for carrying out the invention results in the increase in the quantities of transistors and wirings per pixel, attention must be paid to a reduction of the aperture ratio. However, the reduction of the aperture ratio can be suppressed by employing a fine wiring pattern. In the case of a reflection type LCD in which a conductive and highly reflective metal such as aluminum is used for pixel electrodes Pe, no reduction of the aperture ratio will occur because the TFTs and bus lines are located on the backside of the pixel electrodes Pe.

Although the TFT LCD in the present mode for carrying out the invention has a duplex driving circuit for each bus line, any increase in manufacturing cost attributable to the duplex driving circuit for each bus line can be prevented in a configuration integral with peripheral circuits provided using a low temperature polysilicon manufacturing process because each bus line driving circuit can be formed on a glass substrate simultaneously with a pixel region.

The invention is not limited to the above-described mode of implementation and may be modified in various ways.

For example, while the mode for carrying out the invention has been described with reference to transmission type LCDS, the invention is not limited to them and may be applied to reflection type LCDs and semi-transmission type LCDs.

While the mode for carrying out the invention has been described with reference to TFTs utilizing p-Si as an active semiconductor layer, the invention is not limited to them and may obviously be applied to TFTs utilizing a-Si (amorphous silicon) as an active semiconductor layer.

While the mode for carrying out the invention has been described with reference to LCDs integral with peripheral circuits provided by using a low temperature polysilicon manufacturing process, the invention is not limited to them. The invention may obviously be applied to LCDs in which some or all of peripheral circuits are formed separately from a glass substrate on which pixel TFTs are formed and are wired using TAB mounting or COG mounting.

As described above, the invention makes it possible to reduce a driving voltage of a pixel TFT.

What is claimed is:

1. A liquid crystal display comprising:
   a liquid crystal capacitance formed by sandwiching a liquid crystal between electrodes facing each other;
   a positive polarity driving circuit system for charging the liquid crystal capacitance with a positive charge by applying a voltage having a positive polarity between the electrodes; and
   a negative polarity driving circuit system provided separately from the positive polarity driving circuit system for charging the liquid crystal capacitance with a negative charge by applying a voltage having a negative polarity between the electrodes;
   wherein the electrodes facing each other have:
   a pixel electrode provided at each of a plurality of pixels having the liquid crystal capacitance; and
   a common electrode facing each of the pixel electrodes with the liquid crystal interposed therebetween to apply a common voltage thereto;
   wherein the pixels have:
   a positive-voltage-applying TFT for applying a voltage having the positive polarity to the pixel electrode; and
   a negative-voltage-applying TFT for applying a voltage having the negative polarity to the pixel electrode;
   wherein a conductivity type of channels of the positive-voltage-applying TFT and the negative-voltage-applying TFT is the same;
   wherein an operating range for a gate voltage of the positive-voltage-applying TFT is different from an operating range for a gate voltage of the negative-voltage-applying TFT;
   wherein a potential to keep the positive-voltage-applying TFT off is different from a potential to keep the negative-voltage-applying TFT off; and
   a potential difference between a potential to keep the positive-voltage-applying TFT on and the potential to keep the positive-voltage-applying TFT off is different from a potential difference between a potential to keep the negative-voltage-applying TFT on and the potential to keep the negative-voltage-applying TFT off.

2. A liquid crystal display according to claim 1, wherein the positive polarity driving circuit system has:
   a positive-voltage-applying gate bus line for outputting a positive-voltage-applying gate pulse to a gate electrode of the positive-voltage-applying TFT; and
   a positive-voltage-applying data bus line for outputting a data voltage having the positive polarity to a source or drain electrode of the positive-voltage-applying TFT;
   wherein the negative polarity driving circuit system has:
   a negative-voltage-applying gate bus line for outputting a negative-voltage-applying gate pulse to a gate electrode of the negative-voltage-applying TFT; and
   a negative-voltage-applying data bus line for outputting a data voltage having the negative polarity to a source or drain electrode of the negative-voltage-applying TFT.

3. A liquid crystal display according to claim 2, wherein the positive polarity driving circuit system has:
   a gate bus line driving circuit for positive polarity driving for outputting the positive-voltage-applying gate pulse to the positive-voltage-applying gate bus line; and
   a data bus line driving circuit for positive polarity driving for outputting the data voltage having the positive polarity to the positive-voltage-applying data bus line;
   wherein the negative polarity driving circuit system has:
   a gate bus line driving circuit for negative polarity driving for outputting the negative-voltage-applying gate pulse to the negative-voltage-applying gate bus line; and
   a data bus line driving circuit for negative polarity driving for outputting the data voltage having the negative polarity to the negative-voltage-applying data bus line.

4. A liquid crystal display according to claim 1, wherein a conductivity type of channels of the positive-voltage-applying TFT and the negative-voltage-applying TFT is an n-type.

5. A liquid crystal display according to claim 1, wherein a conductivity type of channels of the positive-voltage-applying TFT and the negative-voltage-applying TFT is a p-type.

6. A liquid crystal display according to claim 1, wherein the positive polarity driving circuit system and the negative polarity driving circuit system are integrally formed on an insulated substrate on which either of the electrodes is formed.

* * * * *